US011143232B2

(12) United States Patent
Negishi et al.

(10) Patent No.: US 11,143,232 B2
(45) Date of Patent: Oct. 12, 2021

(54) SLIDING COMPONENT

(71) Applicant: EAGLE INDUSTRY CO., LTD., Tokyo (JP)

(72) Inventors: Yuta Negishi, Tokyo (JP); Sayaka Kosugi, Tokyo (JP); Hiroki Inoue, Tokyo (JP); Hideyuki Inoue, Tokyo (JP); Takeshi Hosoe, Tokyo (JP); Yuichiro Tokunaga, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 259 days.

(21) Appl. No.: 16/349,209

(22) PCT Filed: Nov. 14, 2017

(86) PCT No.: PCT/JP2017/040830
§ 371 (c)(1),
(2) Date: May 10, 2019

(87) PCT Pub. No.: WO2018/092742
PCT Pub. Date: May 24, 2018

(65) Prior Publication Data
US 2019/0285115 A1 Sep. 19, 2019

(30) Foreign Application Priority Data
Nov. 16, 2016 (JP) .............................. JP2016-223519

(51) Int. Cl.
*F16J 15/34* (2006.01)
*F16C 17/04* (2006.01)
(Continued)

(52) U.S. Cl.
CPC .......... *F16C 17/045* (2013.01); *F16C 33/107* (2013.01); *F16C 33/741* (2013.01); *F16J 15/34* (2013.01)

(58) Field of Classification Search
CPC ....... F16J 15/34; F16C 17/045; F16C 33/107; F16C 33/741
See application file for complete search history.

(56) References Cited

U.S. PATENT DOCUMENTS 4,523,764 A    6/1985  Albers et al.
7,258,346 B2 *  8/2007  Tejima ................. F16J 15/3412
                                              277/399
(Continued)

FOREIGN PATENT DOCUMENTS

JP    57163770 A  * 10/1982  ........... F16J 15/3412
JP    H04-69309 B2    11/1992
(Continued)

OTHER PUBLICATIONS

International Search Report (ISR) dated Jan. 30, 2018, issued for International application No. PCT/JP2017/040830. (1 page).

*Primary Examiner* — Vishal A Patel
(74) *Attorney, Agent, or Firm* — Law Office of Katsuhiro Arai

(57) ABSTRACT

In an exemplary embodiment of a sliding component, a sliding face S is provided with a first fluid-side negative pressure generation mechanism 12 including a first negative pressure generation groove 13, and is provided with a second fluid-side negative pressure generation mechanism 14 including second negative pressure generation grooves 15 located on the second-fluid side of the first fluid-side negative pressure generation mechanism 12, and is further provided with a dynamic pressure generation mechanism 10 including dynamic pressure generation grooves 11 on at least one of the first-fluid side and the second-fluid side of the first fluid-side negative pressure generation mechanism 12 and the second fluid-side negative pressure generation mechanism 14, and the first negative pressure generation groove 13 is isolated from the second-fluid side by a land R,
(Continued)

and the second negative pressure generation grooves 15 are isolated from the first-fluid side by a land R.

6 Claims, 11 Drawing Sheets

(51) Int. Cl.
  *F16C 33/10*   (2006.01)
  *F16C 33/74*   (2006.01)

(56) References Cited

U.S. PATENT DOCUMENTS

| | | | |
|---|---|---|---|
| 2002/0158416 A1* | 10/2002 | Hosanna | F16J 15/3404 |
| | | | 277/358 |
| 2004/0080112 A1* | 4/2004 | Tejima | F16J 15/3436 |
| | | | 277/306 |
| 2005/0212217 A1 | 9/2005 | Tejima | |
| 2013/0209011 A1* | 8/2013 | Tokunaga | F16C 33/74 |
| | | | 384/123 |
| 2015/0123350 A1* | 5/2015 | Itadani | F16J 15/3412 |
| | | | 277/400 |
| 2015/0377297 A1 | 12/2015 | Tokunaga et al. | |
| 2018/0073394 A1 | 3/2018 | Tokunaga et al. | |
| 2019/0331162 A1* | 10/2019 | Negishi | F16J 15/34 |

FOREIGN PATENT DOCUMENTS

| | | |
|---|---|---|
| JP | 2005180652 A | 7/2005 |
| JP | 4719414 B2 | 7/2011 |
| JP | 5693599 B2 | 4/2015 |
| WO | 2014148316 A1 | 9/2014 |
| WO | 2016167262 A1 | 10/2016 |

\* cited by examiner

FIG. 10
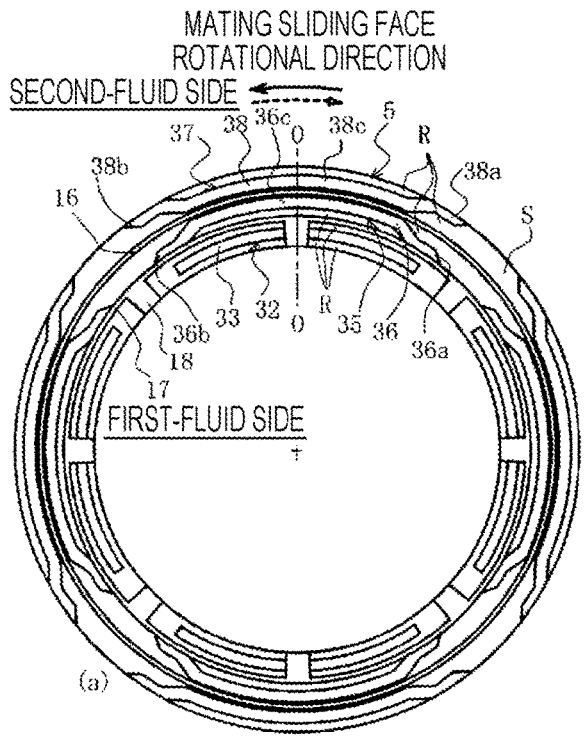
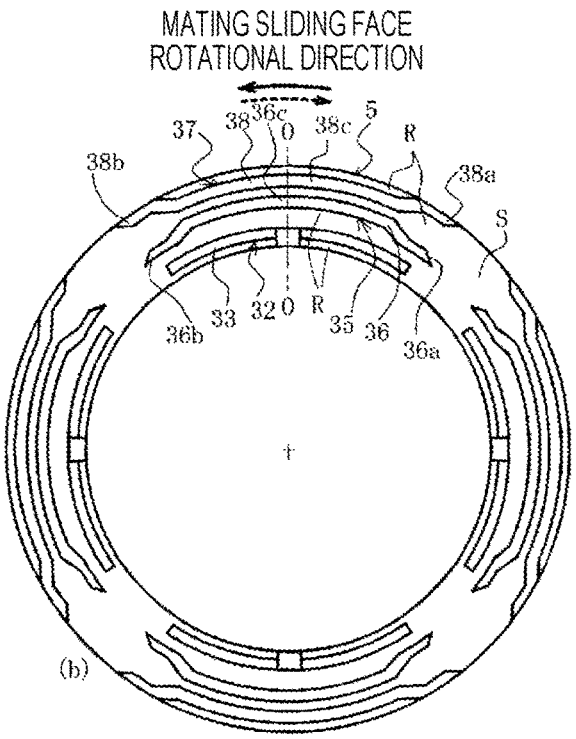
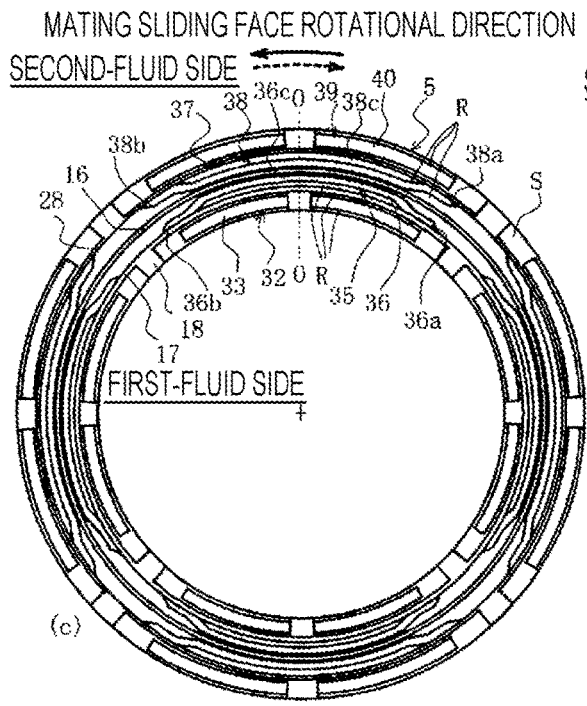
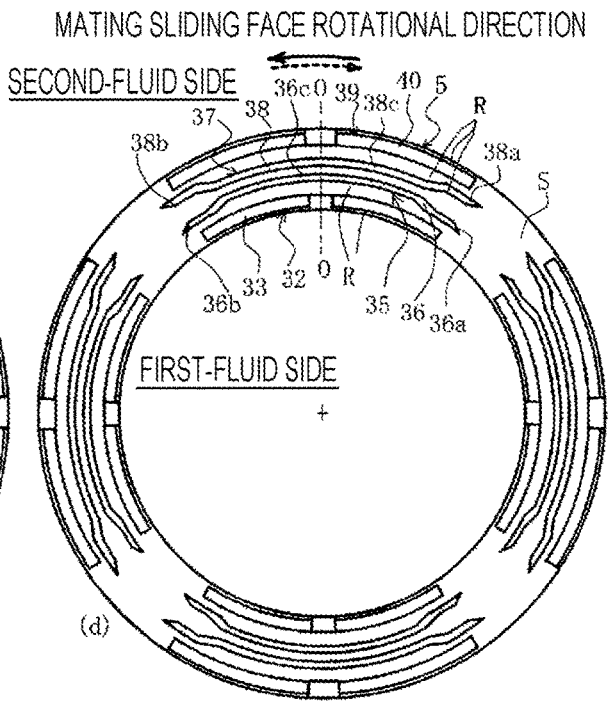

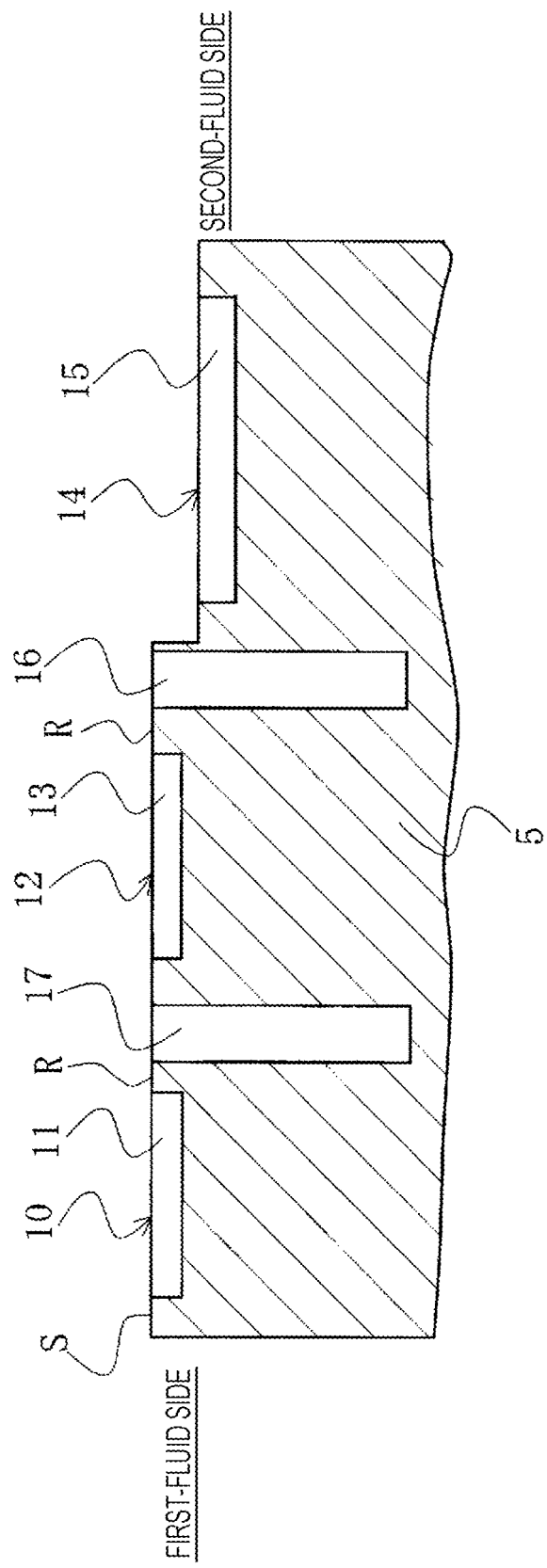

SLIDING COMPONENT

CROSS-REFERENCE TO RELATED APPLICATIONS

This application is the U.S. National Phase under 35 U.S.C. § 371 of International Application PCT/JP2017/040830, filed Nov. 14, 2017, which claims priority to Japanese Patent Application No. 2016-223519, filed Nov. 16, 2016. The International Application was published under PCT Article 21(2) in a language other than English.

TECHNICAL FIELD

The present invention relates to sliding components suitable, for example, as mechanical seals, bearings, and other sliding units. More particularly, the present invention relates to sliding parts such as seal rings or bearings that require friction reduction by fluid intervention between sliding faces, and prevention of fluid leakage from the sliding faces.

BACKGROUND ART

In some mechanical seals, which are an example of sliding components, the sliding face of a sliding part is provided with fine grooves called a surface texture for improvement of lubricity.

The present applicant has filed before an application for an invention in which, to achieve both sealing and lubrication, for example, a positive pressure generation mechanism including spiral grooves or dimples that directly communicate with the high-pressure fluid side is provided on the high-pressure side of one of sliding faces sliding relative to each other of a pair of sliding parts, and a negative pressure generation mechanism formed by a reversed Rayleigh step mechanism on the low-pressure side, and a pressure release groove is provided between the spiral grooves or dimples and the reversed Rayleigh step mechanism, and the pressure release groove and the reversed Rayleigh step mechanism communicate with the high-pressure fluid side through radial grooves and are isolated from the low-pressure fluid side by a sealing face (see Patent Document 1).

The invention disclosed in Patent Document 1 (hereinafter, referred to as a "conventional art") is an invention excellent in the lubricity of the sliding faces and sealing performance of preventing a high-pressure fluid that is a sealed fluid from leaking from the high-pressure fluid side to the low-pressure fluid side. However, the invention is not configured to prevent a low-pressure fluid drawn into the negative pressure generation mechanism provided on the low-pressure side from being discharged to the high-pressure fluid side.

Therefore, the invention cannot address a case where different fluids are present on both sides of the sliding faces, and the mixing of the two fluids can cause danger or cause the sealed fluid to be altered in quality by chemical reaction or the like.

CITATION LIST

Patent Document

Patent Document 1: WO 2014/148316 A1 (FIGS. 13 to 20)

SUMMARY OF THE INVENTION

Problem to be Solved by the Invention

The present invention has been made to solve the problem of the conventional art. It is an object of the present invention to provide a sliding component in which different kinds of fluids are present on both sides of sliding faces, capable of preventing mixing of the different fluids on both sides while achieving both sealing and lubrication.

Means for Solving Problem

To achieve the above object, a sliding component according to a first aspect of the present invention includes a pair of sliding parts sliding relative to each other, the pair of sliding parts each having a sliding face, on both sides of which a first fluid and a second fluid of different kinds are present. In the sliding component, the sliding face of at least one of the sliding parts is provided with a first fluid-side negative pressure generation mechanism including a first negative pressure generation groove, and is provided with a second fluid-side negative pressure generation mechanism including a second negative pressure generation groove located on the second-fluid side of the first fluid-side negative pressure generation mechanism, and is further provided with a dynamic pressure generation mechanism including dynamic pressure generation grooves on at least one of the first-fluid side and the second-fluid side of the first fluid-side negative pressure generation mechanism and the second fluid-side negative pressure generation mechanism, and the first negative pressure generation groove is isolated from the second-fluid side by a land, and the second negative pressure generation groove is isolated from the first-fluid side by a land.

According to this aspect, the mixing of the first fluid and the second fluid of different kinds on both sides can be prevented while both the lubrication of the sliding faces and the sealing of the first fluid and the second fluid are achieved.

According to a second aspect of the present invention, in the sliding component in the first aspect, a circumferential groove is provided between the first fluid-side negative pressure generation mechanism and the second fluid-side negative pressure generation mechanism, and the circumferential groove is isolated from the first-fluid side and the second-fluid side by lands.

According to a third aspect of the present invention, in the sliding component in the second aspect, the circumferential groove has a groove depth set deeper than a groove depth of the dynamic pressure generation grooves, the first negative pressure generation groove, and the second negative pressure generation groove.

According to these aspects, interference between the first fluid-side negative pressure generation mechanism and the second fluid-side negative pressure generation mechanism can be prevented to enhance their respective suction effects and discharge effects.

According to a fourth aspect of the present invention, in the sliding component in the first or second aspect, the first fluid-side negative pressure generation mechanism is formed by a reversed Rayleigh step mechanism, the second fluid-side negative pressure generation mechanism is formed by a spiral mechanism, and the dynamic pressure generation mechanism is provided on the first-fluid side of the first fluid-side negative pressure generation mechanism and is formed by a Rayleigh step mechanism, and the reversed Rayleigh step mechanism has a groove connected to the first-fluid side and isolated from the second-fluid side by a land, the spiral mechanism has grooves connected to the second-fluid side and isolated from the first-fluid side by a land, and the Rayleigh step mechanism has grooves connected to the first-fluid side and isolated from the second-fluid side by a land.

According to this aspect, by the combination of the reversed Rayleigh step mechanism and the spiral mechanism as the negative pressure generation mechanisms and the Rayleigh step mechanism as the dynamic pressure generation mechanism, the negative pressure generation mechanisms and the dynamic pressure generation mechanism can be effectively arranged on the sliding face.

According to a fifth aspect of the present invention, in the sliding component in the first or second aspect, the first fluid-side negative pressure generation mechanism is formed by a first spiral mechanism, the second fluid-side negative pressure generation mechanism is formed by a second spiral mechanism, and the dynamic pressure generation mechanism is provided on the first-fluid side of the first fluid-side negative pressure generation mechanism and is formed by a Rayleigh step mechanism, and the first spiral mechanism has grooves connected to or isolated by a land from the first-fluid side and isolated from the second-fluid side by a land, the second spiral mechanism has grooves isolated from the first-fluid side by a land and connected to the second-fluid side, and the Rayleigh step mechanism has grooves connected to the first-fluid side and isolated from the second-fluid side by a land.

According to this aspect, by the combination of the spiral mechanisms as the negative pressure generation mechanisms and the Rayleigh step mechanism as the dynamic pressure generation mechanism, the negative pressure generation mechanisms and the dynamic pressure generation mechanism can be effectively arranged on the sliding face.

According to a sixth aspect of the present invention, in the sliding component in the first or second aspect, the first fluid-side negative pressure generation mechanism is formed by a first spiral mechanism, the second fluid-side negative pressure generation mechanism is formed by a second spiral mechanism, and the dynamic pressure generation mechanism is provided on the first-fluid side of the first fluid-side negative pressure generation mechanism and is formed by a third spiral mechanism, and the first spiral mechanism has grooves isolated from the first-fluid side by a land and also isolated from the second-fluid side by a land, the second spiral mechanism has grooves isolated from the first-fluid side by a land and connected to the second-fluid side, and the third spiral mechanism has grooves connected to the first-fluid side and isolated from the second-fluid side by a land.

According to this aspect, by the combination of the spiral mechanisms as the negative pressure generation mechanisms and the dynamic pressure generation mechanism, the negative pressure generation mechanisms and the dynamic pressure generation mechanism can be effectively arranged on the sliding face.

According to a seventh aspect of the present invention, in the sliding component in the first or second aspect, the first fluid-side negative pressure generation mechanism is formed by a first reversed Rayleigh step mechanism, the second fluid-side negative pressure generation mechanism is formed by a second reversed Rayleigh step mechanism, and the dynamic pressure generation mechanism is one of dynamic pressure generation mechanisms provided on the first-fluid side of the first fluid-side negative pressure generation mechanism and on the second-fluid side of the second fluid-side negative pressure generation mechanism, each being formed by a Rayleigh step mechanism, and the first reversed Rayleigh step mechanism has a groove connected to the first-fluid side and isolated from the second-fluid side by a land, the second reversed Rayleigh step mechanism has a groove connected to the second-fluid side and isolated from the first-fluid side by a land, and the Rayleigh step mechanism has grooves connected to one of the first-fluid side and the second-fluid side and isolated from the other by a land.

According to this aspect, by the combination of the reversed Rayleigh step mechanisms as the negative pressure generation mechanisms and the Rayleigh step mechanisms as the dynamic pressure generation mechanisms, the negative pressure generation mechanisms and the dynamic pressure generation mechanisms can be effectively arranged on the sliding face. Further, since the dynamic pressure generation mechanisms are provided on both sides, the first-fluid side and the second-fluid side, a fluid film can be formed over the entire sliding face, and the lubrication of the sliding faces can be further ensured.

According to a eighth aspect of the present invention, in the sliding component in the first or second aspect, the first fluid-side negative pressure generation mechanism is formed by a first spiral mechanism, the second fluid-side negative pressure generation mechanism is formed by a second spiral mechanism, and the dynamic pressure generation mechanism is one of dynamic pressure generation mechanisms that are provided on the first-fluid side of the first fluid-side negative pressure generation mechanism and on the second-fluid side of the second fluid-side negative pressure generation mechanism, and are formed by third and fourth spiral mechanisms, respectively, and the first spiral mechanism has grooves connected to or isolated by a land from the first-fluid side and isolated from the second-fluid side by a land, the second spiral mechanism has grooves isolated from the first-fluid side by a land and connected to or isolated by a land from the second-fluid side, the third spiral mechanism has grooves connected to the first-fluid side and isolated from the second-fluid side by a land, and the fourth spiral mechanism is isolated from the first-fluid side by a land and connected to the second-fluid side.

According to this aspect, by the combination of the spiral mechanisms as the negative pressure generation mechanisms and the dynamic pressure generation mechanisms, the negative pressure generation mechanisms and the dynamic pressure generation mechanisms can be effectively arranged on the sliding face. Further, since the dynamic pressure generation mechanisms are provided on both sides, the first-fluid side and the second-fluid side, a fluid film can be formed over the entire sliding face, and the lubrication of the sliding faces can be further ensured.

According to an ninth aspect of the present invention, in the sliding component in the first aspect, the first negative pressure generation groove, the second negative pressure generation groove, and the dynamic pressure generation grooves are formed symmetrically about a radial line passing through a center of rotation.

According to this aspect, a sliding component suitable for both-direction rotation specifications can be provided which allows a seal ring provided with a surface texture to be used without being changed even when a rotating-side seal ring rotates in both directions.

According to a tenth aspect of the present invention, in the sliding component in any one of the first to eighth aspects, a sliding face provided with the second fluid-side negative pressure generation mechanism is set in a lower position axially away from a mating sliding face relative to a sliding face provided with the first fluid-side negative pressure generation mechanism and the dynamic pressure generation mechanism.

According to this aspect, the design can have a degree of freedom, and can achieve almost the same discharge function as that when they are provided on the same plane.

Effect of the Invention

The present invention achieves the following outstanding effects.

(1) In the sliding component in which the first fluid and the second fluid of different kinds are present on both sides of the sliding faces of the pair of sliding parts, the sliding face of at least one of the sliding parts is provided with the first fluid-side negative pressure generation mechanism including the first negative pressure generation groove, and is provided with the second fluid-side negative pressure generation mechanism including the second negative pressure generation groove located on the second-fluid side of the first fluid-side negative pressure generation mechanism, and is further provided with the dynamic pressure generation mechanism including the dynamic pressure generation grooves on at least one of the first-fluid side and the second-fluid side of the first fluid-side negative pressure generation mechanism and the second fluid-side negative pressure generation mechanism, and the first negative pressure generation groove is isolated from the second-fluid side by the land, and the second negative pressure generation groove is isolated from the first-fluid side by the land. Consequently, the mixing of the first fluid and the second fluid of different kinds on both sides can be prevented while both the lubrication of the sliding faces and the sealing of the first fluid and the second fluid are achieved.

(2) The circumferential groove is provided between the first fluid-side negative pressure generation mechanism and the second fluid-side negative pressure generation mechanism, and the circumferential groove is isolated from the first-fluid side and the second-fluid side by the lands. The circumferential groove has the groove depth set deeper than the groove depth of the dynamic pressure generation grooves, the first negative pressure generation groove, and the second negative pressure generation groove. Consequently, interference between the first fluid-side negative pressure generation mechanism and the second fluid-side negative pressure generation mechanism can be prevented to enhance their respective suction effects and discharge effects.

(3) The first fluid-side negative pressure generation mechanism is formed by the reversed Rayleigh step mechanism, the second fluid-side negative pressure generation mechanism is formed by the spiral mechanism, and the dynamic pressure generation mechanism is provided on the first-fluid side of the first fluid-side negative pressure generation mechanism and is formed by the Rayleigh step mechanism, and the reversed Rayleigh step mechanism has the groove connected to the first-fluid side and isolated from the second-fluid side by the land, the spiral mechanism has the grooves connected to the second-fluid side and isolated from the first-fluid side by the land, and the Rayleigh step mechanism has the grooves connected to the first-fluid side and isolated from the second-fluid side by the land. Consequently, by the combination of the reversed Rayleigh step mechanism and the spiral mechanism as the negative pressure generation mechanisms and the Rayleigh step mechanism as the dynamic pressure generation mechanism, the negative pressure generation mechanisms and the dynamic pressure generation mechanism can be effectively arranged on the sliding face.

(4) The first fluid-side negative pressure generation mechanism is formed by the first spiral mechanism, the second fluid-side negative pressure generation mechanism is formed by the second spiral mechanism, and the dynamic pressure generation mechanism is provided on the first-fluid side of the first fluid-side negative pressure generation mechanism and is formed by the Rayleigh step mechanism, and the first spiral mechanism has the grooves connected to or isolated by the land from the first-fluid side and isolated from the second-fluid side by the land, the second spiral mechanism has the grooves isolated from the first-fluid side by the land and connected to the second-fluid side, and the Rayleigh step mechanism has the grooves connected to the first-fluid side and isolated from the second-fluid side by the land. Consequently, by the combination of the spiral mechanisms as the negative pressure generation mechanisms and the Rayleigh step mechanism as the dynamic pressure generation mechanism, the negative pressure generation mechanisms and the dynamic pressure generation mechanism can be effectively arranged on the sliding face.

(5) The first fluid-side negative pressure generation mechanism is formed by the first spiral mechanism, the second fluid-side negative pressure generation mechanism is formed by the second spiral mechanism, and the dynamic pressure generation mechanism is provided on the first-fluid side of the first fluid-side negative pressure generation mechanism and is formed by the third spiral mechanism, and the first spiral mechanism has the grooves isolated from the first-fluid side by the land and also isolated from the second-fluid side by the land, the second spiral mechanism has the grooves isolated from the first-fluid side by the land and connected to the second-fluid side, and the third spiral mechanism has the grooves connected to the first-fluid side and isolated from the second-fluid side by the land. Consequently, by the combination of the spiral mechanisms as the negative pressure generation mechanisms and the dynamic pressure generation mechanism, the negative pressure generation mechanisms and the dynamic pressure generation mechanism can be effectively arranged on the sliding face.

(6) The first fluid-side negative pressure generation mechanism is formed by the first reversed Rayleigh step mechanism, the second fluid-side negative pressure generation mechanism is formed by the second reversed Rayleigh step mechanism, and the dynamic pressure generation mechanism is one of the dynamic pressure generation mechanisms provided on the first-fluid side of the first fluid-side negative pressure generation mechanism and on the second-fluid side of the second fluid-side negative pressure generation mechanism, each being formed by the Rayleigh step mechanism, and the first reversed Rayleigh step mechanism has the groove connected to the first-fluid side and isolated from the second-fluid side by the land, the second reversed Rayleigh step mechanism has the groove connected to the second-fluid side and isolated from the first-fluid side by the land, and the Rayleigh step mechanism has the grooves connected to one of the first-fluid side and the second-fluid side and isolated from the other by the land. Consequently, by the combination of the reversed Rayleigh step mechanisms as the negative pressure generation mechanisms and the Rayleigh step mechanisms as the dynamic pressure generation mechanisms, the negative pressure generation mechanisms and the dynamic pressure generation mechanisms can be effectively arranged on the sliding face. Further, since the dynamic pressure generation mechanisms are provided on both sides, the first-fluid side and the second-fluid side, a fluid film can be formed over the entire sliding face, and the lubrication of the sliding faces can be further ensured.

(7) The first fluid-side negative pressure generation mechanism is formed by the first spiral mechanism, the second fluid-side negative pressure generation mechanism is formed by the second spiral mechanism, and the dynamic pressure generation mechanism is one of the dynamic pressure generation mechanisms that are provided on the first-fluid side of the first fluid-side negative pressure generation mechanism and on the second-fluid side of the second fluid-side negative pressure generation mechanism, and are formed by the third and fourth spiral mechanisms, respectively, and the first spiral mechanism has the grooves connected to or isolated by the land from the first-fluid side and isolated from the second-fluid side by the land, the second spiral mechanism has the grooves isolated from the first-fluid side by the land and connected to or isolated by the land from the second-fluid side, the third spiral mechanism has the grooves connected to the first-fluid side and isolated from the second-fluid side by the land, and the fourth spiral mechanism is isolated from the first-fluid side by the land and connected to the second-fluid side. Consequently, by the combination of the spiral mechanisms as the negative pressure generation mechanisms and the dynamic pressure generation mechanisms, the negative pressure generation mechanisms and the dynamic pressure generation mechanisms can be effectively arranged on the sliding face. Further, since the dynamic pressure generation mechanisms are provided on both sides, the first-fluid side and the second-fluid side, a fluid film can be formed over the entire sliding face, and the lubrication of the sliding faces can be further ensured.

(8) The first negative pressure generation groove, the second negative pressure generation groove, and the dynamic pressure generation grooves are formed symmetrically about the radial line passing through the center of rotation. Consequently, a sliding component suitable for both-direction rotation specifications can be provided which allows a seal ring provided with a surface texture to be used without being changed even when a rotating-side seal ring rotates in both directions.

(9) The sliding face provided with the second fluid-side negative pressure generation mechanism is set in a lower position axially away from the mating sliding face relative to the sliding face provided with the first fluid-side negative pressure generation mechanism and the dynamic pressure generation mechanism. Consequently, the design can have a degree of freedom, and can achieve almost the same discharge function as that when they are provided on the same plane.

BRIEF DESCRIPTION OF THE DRAWINGS

FIGS. 10A to 10D show a plan view of a sliding face of a sliding part according to a sixth embodiment of the present invention.

FIG. 11 shows a cross-sectional view of a sliding face of a sliding part according to a seventh embodiment of the present invention.

DESCRIPTION OF EMBODIMENTS

Hereinafter with reference to the drawings, a mode for carrying out this invention will be described illustratively based on embodiments. However, the dimensions, materials, shapes, relative arrangements, and the like of components described in the embodiments are not intended to limit the scope of the present invention only to them, unless otherwise described explicitly.

First Embodiment

With reference to FIGS. 1 to 4, a sliding component according to a first embodiment of the present invention will be described.

The present embodiment will be described with a case where parts constituting a mechanical seal are sliding parts, as an example.

Figure 1:
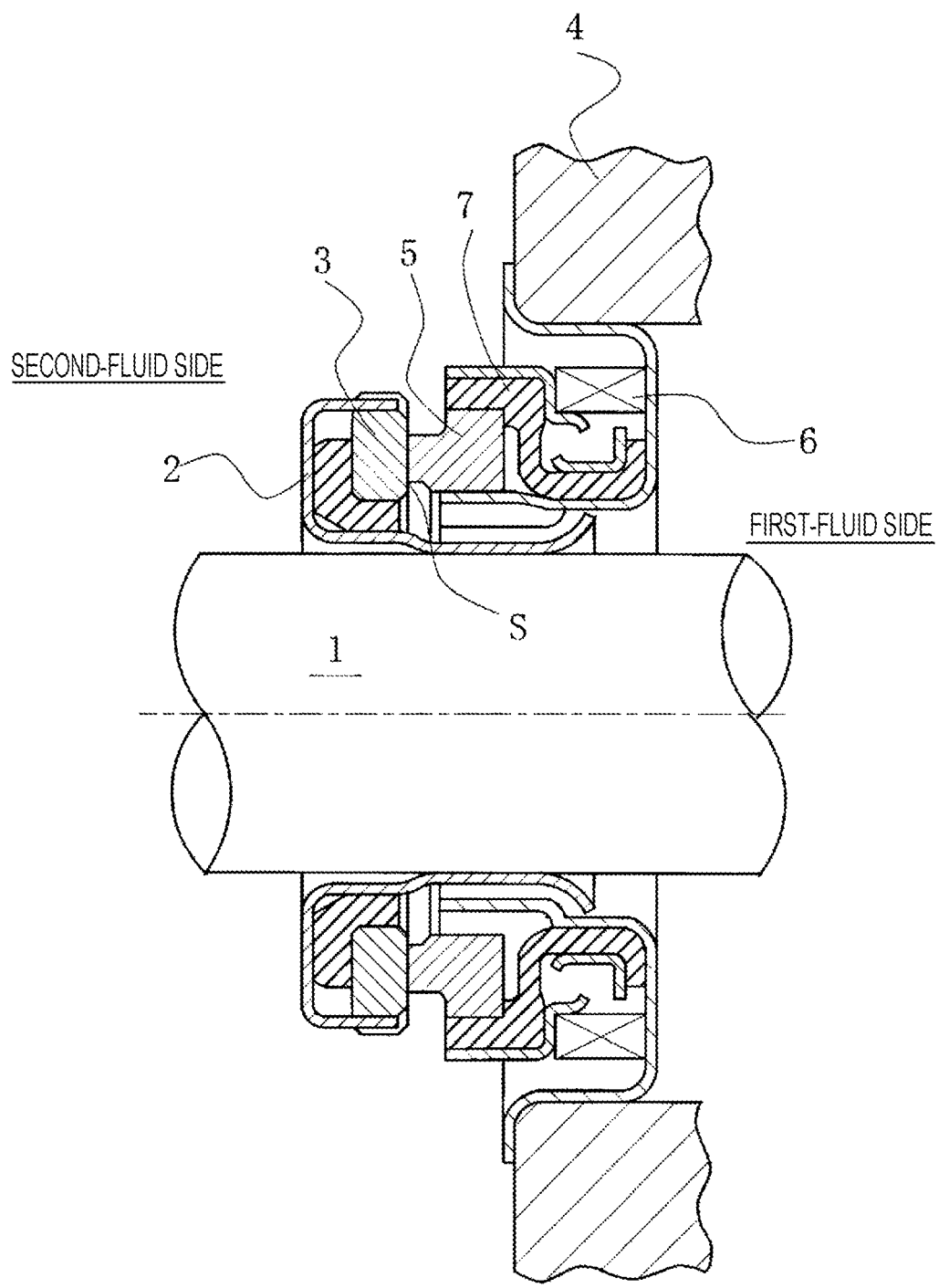
FIG. 1 is a vertical cross-sectional view showing an example of a mechanical seal according to a first embodiment of the present invention.
Figure 2:
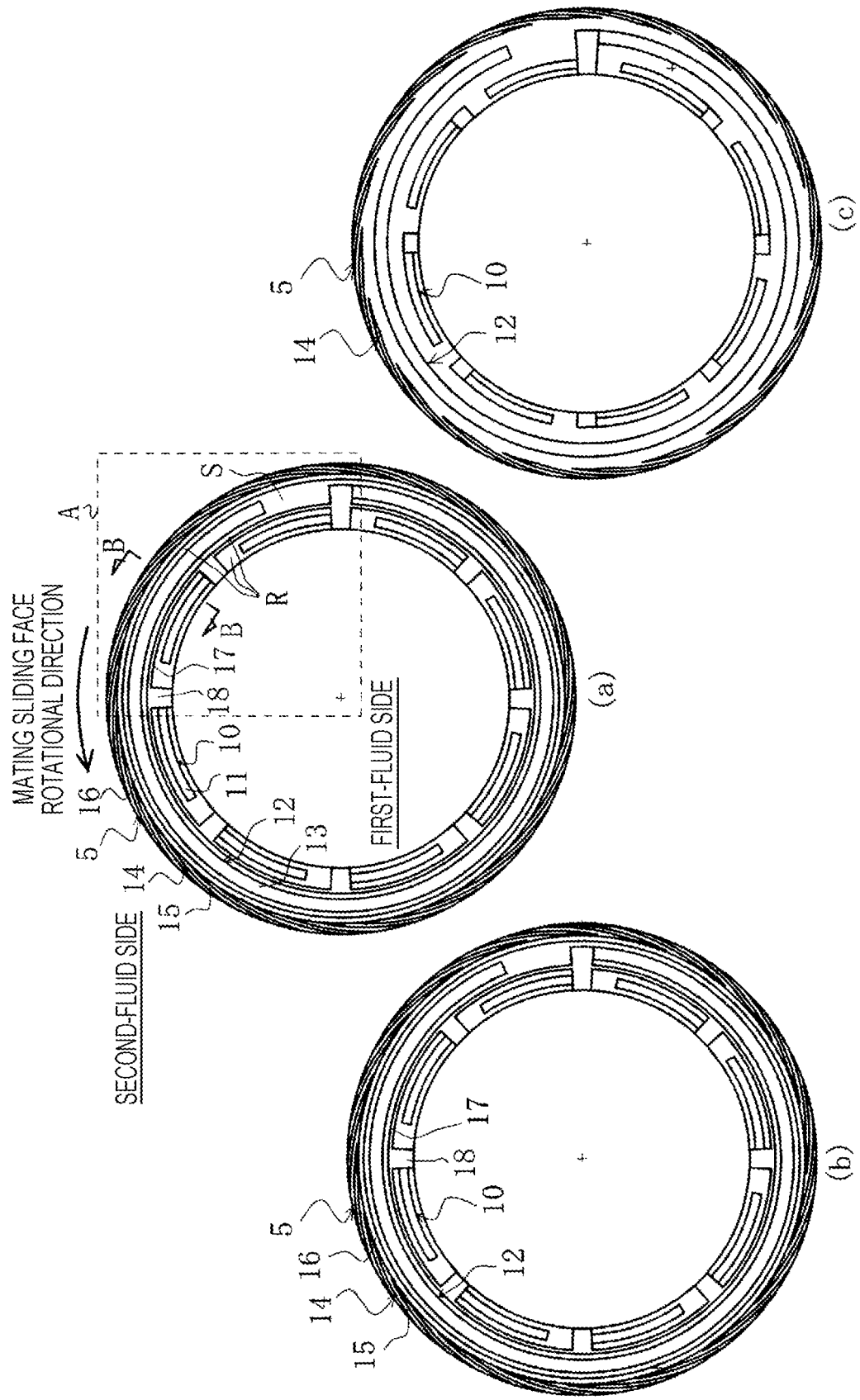
FIGS. 2A to 2C show a plan view of a sliding face of a sliding part according to the first embodiment of the present invention.

FIG. 1 is a vertical cross-sectional view showing an example of a mechanical seal, in which a first fluid is present on the inner peripheral side of sliding faces S, and a second fluid is present on the outer peripheral side. The mechanical seal is configured to lubricate the sliding faces and to prevent mixing of the first fluid and the second fluid of different kinds. For example, an annular rotating-side seal ring 3, which is provided via a sleeve 2 at a rotating shaft 1 to drive a pump impeller (not shown) on the second-fluid side, in a state of being integrally rotatable with the rotating shaft 1, and an annular stationary-side seal ring 5, which is provided at a pump housing 4 in non-rotating and axially movable states, slide in close contact on each other's sliding faces S ground by lapping or the like, by means of a coiled wave spring 6 and a bellows 7 both axially biasing the stationary-side seal ring 5.

That is, the mechanical seal prevents, at each other's sliding faces S of the rotating-side seal ring 3 and the stationary-side seal ring 5, the first fluid, e.g. water, and the second fluid, e.g. oil, of different kinds from being mixed together.

Although the present example describes a case where the first fluid is present on the inner peripheral side of the sliding faces and the second fluid on the outer peripheral side, the opposite has the same effects as those in the present example.

FIGS. 2A to 2C show a plan view of a sliding face of a sliding part according to the first embodiment of the present invention, and describe a case where a surface texture is provided to the sliding face of the stationary-side seal ring 5 in FIG. 1, as an example.

Note that the same applies to a case where a surface texture is provided to the sliding face of the rotating-side seal ring 3.

In FIG. 2A, the rotational direction of the mating sliding face S that slides relative to the sliding face S of the stationary-side seal ring 5 is a counterclockwise direction.

Note that when the mating sliding face S rotates in a clockwise direction, it is only necessary to reverse the orientation of the surface texture on the sliding face S of the stationary-side seal ring 5.

The sliding face S of the stationary-side seal ring 5 is provided with a dynamic pressure generation mechanism 10 including dynamic pressure generation grooves 11 located on the first-fluid side, is provided with a first fluid-side negative pressure generation mechanism 12 including a first negative pressure generation groove 13 located on the center side of the dynamic pressure generation mechanism 10, and is provided with a second fluid-side negative pressure generation mechanism 14 including second negative pressure generation grooves 15 located on the second-fluid side of the first fluid-side negative pressure generation mechanism 12.

Between the first fluid-side negative pressure generation mechanism 12 and the second fluid-side negative pressure generation mechanism 14, an annular first circumferential groove 16 is provided which is deeper than the groove depth of the dynamic pressure generation grooves 11, the first negative pressure generation groove 13, and the second negative pressure generation grooves 15. The first circumferential groove 16 is isolated from the first-fluid side and the second-fluid side by lands R.

Further, in the present example, an annular second circumferential groove 17 is provided between the dynamic pressure generation mechanism 10 and the first fluid-side negative pressure generation mechanism 12. The second circumferential groove 17 is connected to the first-fluid side through radial deep grooves 18, and is isolated from the second-fluid side by a land R.

The dynamic pressure generation mechanism 10 is formed by a Rayleigh step mechanism. The dynamic pressure generation grooves 11 are formed by grooves (hollows or recesses) of the Rayleigh step mechanism.

The first fluid-side negative pressure generation mechanism 12 is formed by a reversed Rayleigh step mechanism. The first negative pressure generation groove 13 is formed by a groove of the reversed Rayleigh step mechanism.

The second fluid-side negative pressure generation mechanism 14 is formed by a spiral mechanism. The second negative pressure generation grooves 15 are formed by grooves of the spiral mechanism.

A downstream end of the groove 13 of the reversed Rayleigh step mechanism 12 is connected to the first-fluid side through a radial deep groove 18 and isolated from the second-fluid side by a land R.

The grooves 15 of the spiral mechanism 14 are connected to the second-fluid side and isolated from the first-fluid side by a land R.

The grooves 11 of the Rayleigh step mechanism 10 are connected at an upstream end thereof to the first-fluid side through the radial deep grooves 18, and are isolated from the second-fluid side by a land R.

The lands R mean smooth portions of the sliding face S.

The dynamic pressure generation mechanism 10 (Rayleigh step mechanism 10) generates dynamic pressure (positive pressure) to cause the first fluid to enter between the sliding faces to increase a fluid film, and thereby improves lubrication performance.

The first fluid-side negative pressure generation mechanism 12 (reversed Rayleigh step mechanism 12) generates negative pressure to draw in the first fluid present between the sliding faces and discharges it to the first-fluid side, and prevents the first fluid that has entered between the sliding faces from entering the second-fluid side that is the outer peripheral side.

The second fluid-side negative pressure generation mechanism 14 (spiral mechanism 14) generates negative pressure to draw in the second fluid present between the sliding faces and discharges it to the second-fluid side, and prevents the second fluid that has entered between the sliding faces from entering the first-fluid side that is the inner peripheral side.

The first circumferential groove 16 prevents interference between the first fluid-side negative pressure generation mechanism 12 (reversed Rayleigh step mechanism 12) and the second fluid-side negative pressure generation mechanism 14 (spiral mechanism 14) to enhance their respective suction effects and discharge effects.

The second circumferential groove 17 prevents interference between the dynamic pressure generation mechanism 10 (Rayleigh step mechanism 10) and the first fluid-side negative pressure generation mechanism 12 (reversed Rayleigh step mechanism 12) to enhance their respective suction effects and discharge effects.

Figure 3:
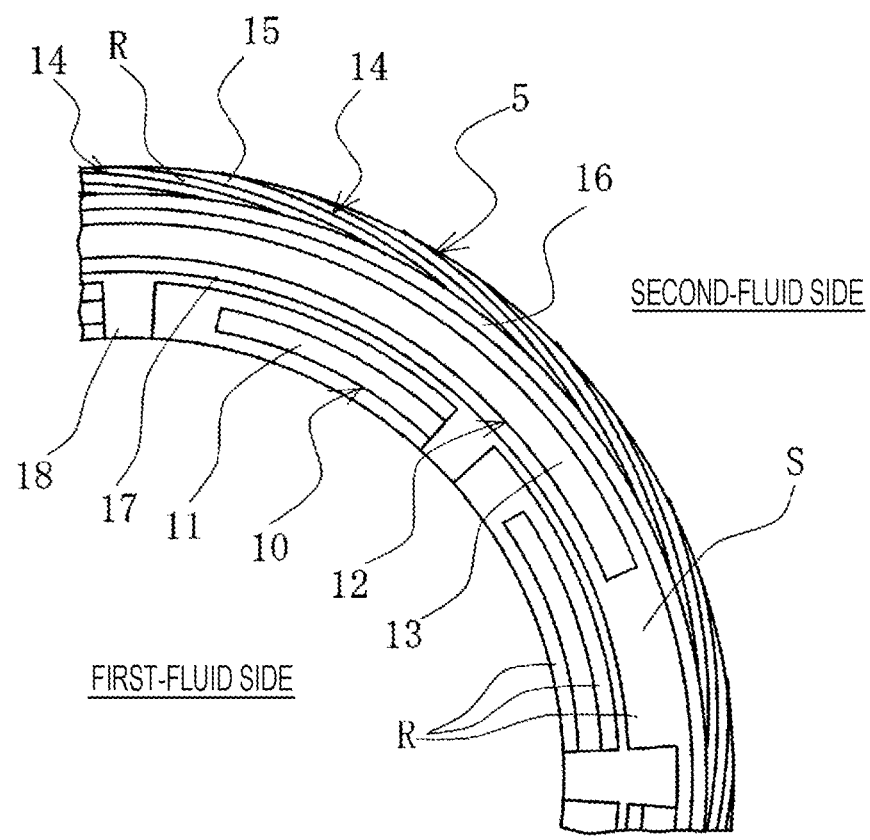
FIG. 3 is an enlarged view of a portion A in FIG. 2A enlarged.

As clearly shown in FIG. 3, the grooves 15 of the spiral mechanism 14 are provided in such a manner as to spread from upstream to downstream, and have a downstream end connected to the second-fluid side.

Note that in the present description, the plane shape of the individual grooves 15 themselves may be a curved shape as shown in FIG. 3, or may be a linear shape. Also in a linear shape, the grooves 15 only need to be provided in such a manner as to spread from upstream to downstream.

Upstream ends of the grooves 15 may be connected to the first circumferential groove 16 as shown in FIGS. 2A and 3, or may be isolated from the first circumferential groove 16 by a land as shown in FIG. 2B.

Further, as shown in FIG. 2C, even when the first circumferential groove 16 and the second circumferential groove 17 are not provided, the object of the present invention can be achieved.

The depths and the widths of the grooves 11, 13, and 15, and the first circumferential groove 16, the second circumferential groove 17, and the radial deep grooves 18 are determined suitably according to the diameters of the sliding parts 3 and 5, the sliding face width, and relative movement speed, and sealing and lubrication conditions and the like.

As an example, the depth of the first circumferential groove 16, the second circumferential groove 17, and the radial deep grooves 18 is ten times or more the depth of the grooves 11, 13, and 15.

Next, with reference to FIG. 4, the cross-sectional shape of the sliding face of the stationary-side seal ring 5 will be described.

Figure 4:
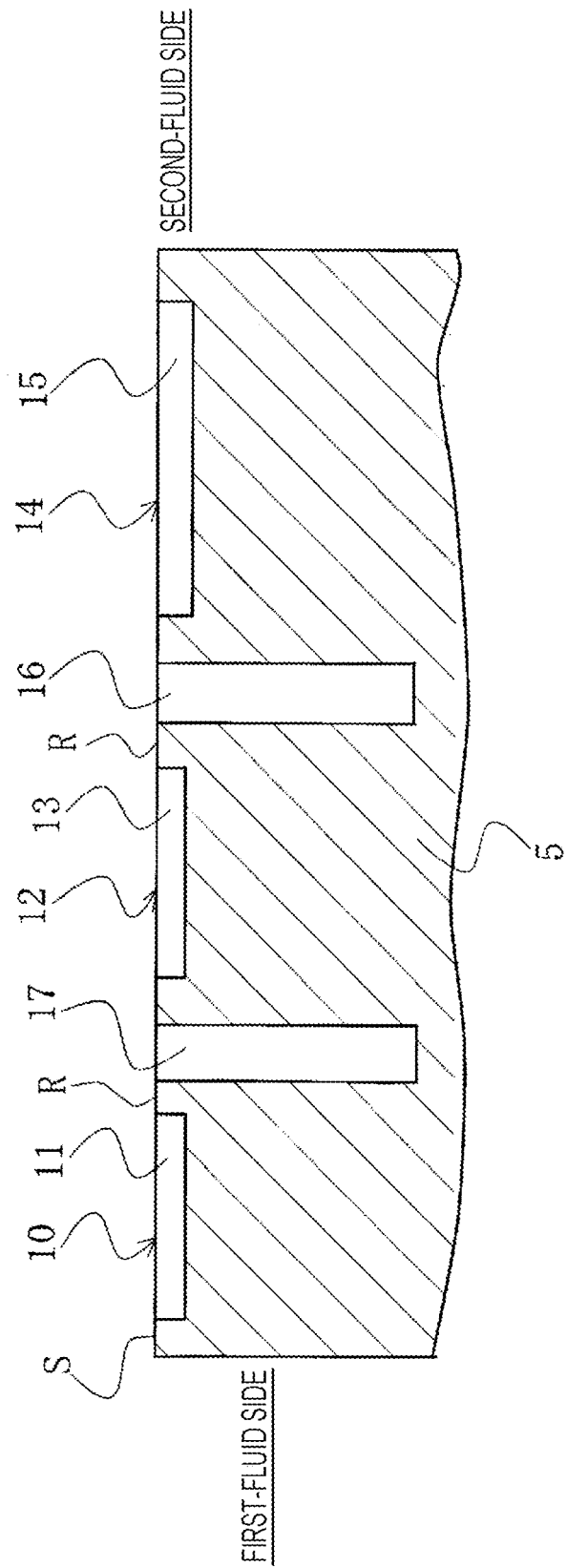
FIG. 4 is a cross-sectional view taken along line B-B in FIG. 2A.

In FIG. 4, the dynamic pressure generation groove 11 (groove 11) of the dynamic pressure generation mechanism 10 (Rayleigh step mechanism 10), the first negative pressure generation groove 13 (groove 13) of the first fluid-side negative pressure generation mechanism 12 (reversed Rayleigh step mechanism 12), and the second negative pressure generation groove 15 (groove 15) of the second fluid-side negative pressure generation mechanism 14 (spiral mechanism 14) are formed on the sliding face S that slides on the mating sliding face S.

The first circumferential groove 16 is provided between the first negative pressure generation groove 13 (groove 13) and the second negative pressure generation groove 15 (groove 15). The second circumferential groove 17 is provided between the dynamic pressure generation groove 11 (groove 11) and the first negative pressure generation groove 13 (groove 13).

Next, with reference to FIGS. 5A and 5B, a dynamic pressure (positive pressure) generation mechanism formed by a Rayleigh step mechanism or the like, and a negative pressure generation mechanism formed by a reversed Rayleigh step mechanism or the like will be described.

Figure 5:
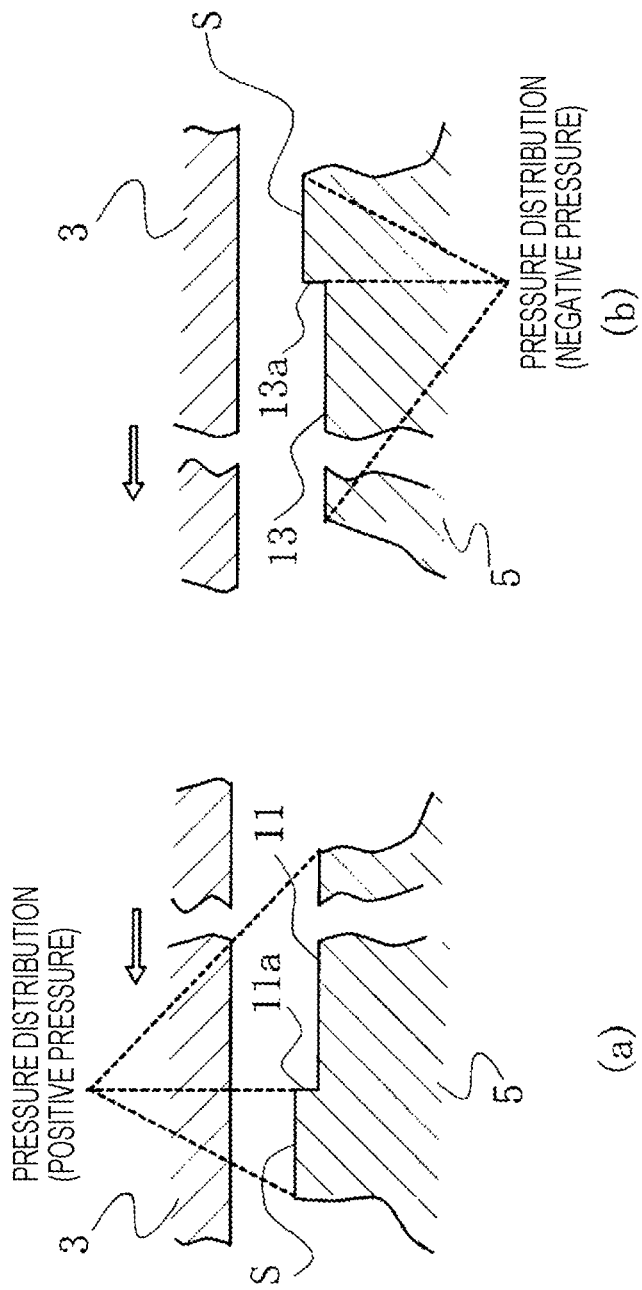
FIG. 5A is a diagram for explaining a positive pressure generation mechanism including a narrowed gap (step) downstream of a dimple.
FIG. 5B is a diagram for explaining a negative pressure generation mechanism including a widened gap (step) upstream of a dimple.

In FIG. 5A, the rotating-side seal ring 3, which is an opposite sliding part, and the stationary-side seal ring 5 slide relatively as shown by an arrow. On the sliding face of the stationary-side seal ring 5, a Rayleigh step 11a is formed which is perpendicular to the relative movement direction and faces upstream, constituting a narrowed gap (step). A groove 11 as a dynamic pressure (positive pressure) generation groove is formed upstream of the Rayleigh step 11a. The sliding face S of the opposite rotating-side seal ring 3 and the stationary-side seal ring 5 is flat.

When the rotating-side seal ring 3 and the stationary-side seal ring 5 relatively move in the direction shown by the arrow, fluid intervening between the sliding faces S of the rotating-side seal ring 3 and the stationary-side seal ring 5 tends to follow and move in the movement direction of the rotating-side seal ring 3 or the stationary-side seal ring 5 due to its viscosity. Consequently, at that time, dynamic pressure (positive pressure) as shown by broken lines is generated by the presence of the Rayleigh step 11a.

Note that the reference character R denotes a land.

Also in FIG. 5B, the rotating-side seal ring 3, which is an opposite sliding part, and the stationary-side seal ring 5 slide relatively as shown by an arrow. On the sliding face of the rotating-side seal ring 3 and the stationary-side seal ring 5, a reversed Rayleigh step 13a is formed which is perpendicular to the relative movement direction and faces downstream, constituting a widened gap (step). A groove 13 as a negative pressure generation groove is formed downstream of the reversed Rayleigh step 13a. The sliding face of the opposite rotating-side seal ring 3 and the stationary-side seal ring 5 is flat.

When the rotating-side seal ring 3 and the stationary-side seal ring 5 relatively move in the direction shown by the arrow, fluid intervening between the sliding faces S of the rotating-side seal ring 3 and the stationary-side seal ring 5 tends to follow and move in the movement direction of the rotating-side seal ring 3 or the stationary-side seal ring 5 due to its viscosity. Consequently, at that time, negative pressure as shown by broken lines is generated by the presence of the reversed Rayleigh step 13a.

Here, when the rotating shaft 1 is driven, rotating the rotating-side seal ring 3, the sliding faces S of the rotating-side seal ring 3 and the stationary-side seal ring 5 slide relatively. Dynamic pressure (positive pressure) is generated by the dynamic pressure generation mechanism 10, and the sliding faces S are slightly separated from each other. The first fluid is gradually introduced into the sliding faces S from the first-fluid side, and the second fluid from the second-fluid side, and the sliding faces S are held in a non-contact state by fluid lubrication action. On the other hand, the first fluid that has entered from the first-fluid side is drawn in by the first fluid-side negative pressure generation mechanism 12 (reversed Rayleigh step mechanism 12), and discharged to the first-fluid side. At the same time, the second fluid that has entered from the second-fluid side is drawn in by the second fluid-side negative pressure generation mechanism 14 (spiral mechanism 14), and discharged to the second-fluid side.

This can prevent the mixing of the first fluid and the second fluid of different kinds on both sides while achieving both the lubrication of the sliding faces S and the sealing of the first fluid and the second fluid.

The configuration of the first embodiment described above has the following outstanding effects.

(1) In a sliding component in which a first fluid and a second fluid of different kinds are present on both sides of sliding faces of a pair of sliding parts, the sliding face of at least one of the sliding parts is provided with the first fluid-side negative pressure generation mechanism (reversed Rayleigh step mechanism 12) including the first negative pressure generation groove 13 (groove 13), and is provided with the second fluid-side negative pressure generation mechanism 14 (spiral mechanism 14) including the second negative pressure generation grooves (grooves 15) located on the second-fluid side of the first fluid-side negative pressure generation mechanism 12 (reversed Rayleigh step mechanism 12), and is further provided with the dynamic pressure generation mechanism 10 (Rayleigh step mechanism 10) including the dynamic pressure generation grooves 11 (grooves 11) on the first-fluid side of the first fluid-side negative pressure generation mechanism 12 (reversed Rayleigh step mechanism 12) and the second fluid-side negative pressure generation mechanism 14 (spiral mechanism 14). The first negative pressure generation groove 13 (groove 13) of the first fluid-side negative pressure generation mechanism 12 (reversed Rayleigh step mechanism 12) is connected to the first-fluid side and isolated from the second-fluid side by the land R. The second negative pressure generation grooves 15 (grooves 15) of the second fluid-side negative pressure generation mechanism 14 (spiral mechanism 14) are connected to the second-fluid side and isolated from the first-fluid side by the land R. The dynamic pressure generation grooves 11 (grooves 11) of the dynamic pressure generation mechanism 10 (Rayleigh step mechanism 10) are connected to the first-fluid side and isolated from the second-fluid side by the land R. Consequently, the mixing of the first fluid and the second fluid of different kinds on both sides can be prevented while the lubrication of the sliding faces S and the sealing of the first fluid and the second fluid are achieved.

(2) Between the first fluid-side negative pressure generation mechanism 12 (reversed Rayleigh step mechanism 12) and the second fluid-side negative pressure generation mechanism 14 (spiral mechanism 14), the first circumferential groove 16 is provided which is deeper than the groove depth of the dynamic pressure generation grooves (grooves 11), the first negative pressure generation groove 13 (groove 13), and the second negative pressure generation grooves 15 (grooves 15). The first circumferential groove 16 is isolated from the first-fluid side and the second-fluid side by the lands R. Consequently, interference between the first fluid-side negative pressure generation mechanism 12 (reversed Rayleigh step mechanism 12) and the second fluid-side negative pressure generation mechanism 14 (spiral mechanism 14) can be prevented to enhance their respective suction effects and discharge effects.

(3) Between the dynamic pressure generation mechanism 10 (Rayleigh step mechanism 10) and the first fluid-side negative pressure generation mechanism 12 (reversed Rayleigh step mechanism 12), the annular second circumferential groove 17 is provided. The second circumferential groove 17 is connected to the first-fluid side through the radial deep grooves 18, and is isolated from the second-fluid side by the land R. Consequently, interference between the dynamic pressure generation mechanism 10 (Rayleigh step mechanism 10) and the first fluid-side negative pressure generation mechanism 12 (reversed Rayleigh step mechanism 12) can be prevented to enhance their respective suction effects and discharge effects.

Second Embodiment

With reference to FIGS. 6A to 6F, a sliding component according to a second embodiment of the present invention will be described.

The second embodiment is different from the first embodiment in that the first fluid-side negative pressure generation mechanism is formed by a spiral mechanism, but the other basic configuration thereof is the same as that of the first embodiment. The same reference numeral is assigned to the same member without duplicated explanation.

In FIGS. 6A to 6F, grooves 21 of a spiral mechanism 20 constituting the first fluid-side negative pressure generation mechanism is of a curved (spiral) shape reduced in size from upstream to downstream in the central direction. Consequently, by sliding on the mating sliding face, negative pressure is generated at the grooves 21, and fluid drawn into the grooves 21 is urged toward the first-fluid side.

Figure 6:
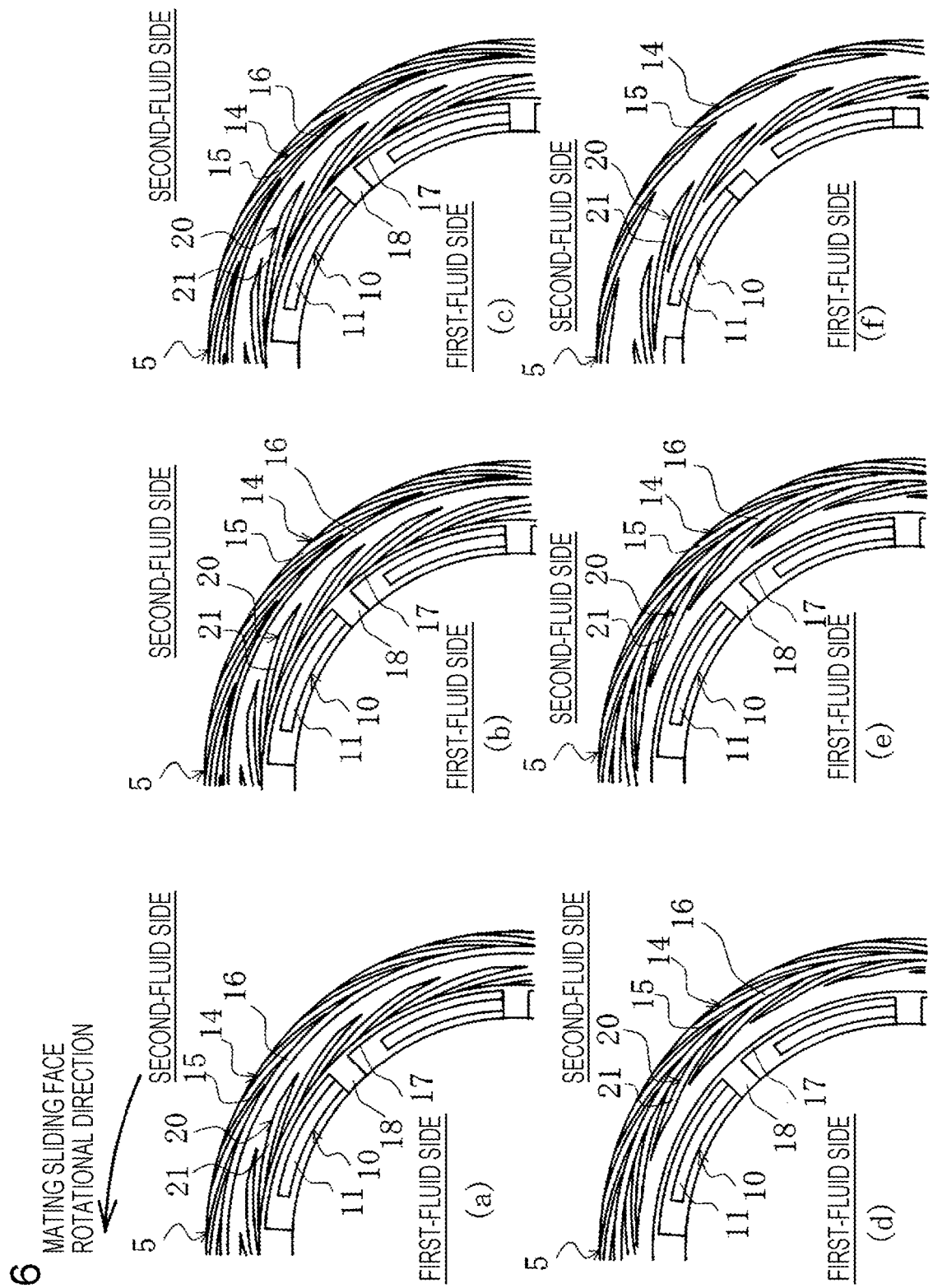
FIGS. 6A to 6F show a plan view of a sliding face of a sliding part according to a second embodiment of the present invention.

In FIG. 6A, upstream ends of the grooves 21 are isolated from the first circumferential groove 16 by a land, and downstream ends are connected to the second circumferential groove 17.

This ensures that fluid drawn into the grooves 21 is discharged to the first-fluid side.

Upstream ends of the second negative pressure generation grooves 15 (grooves 15) of the second fluid-side negative pressure generation mechanism 14 (spiral mechanism 14) are connected to the first circumferential groove 16.

In FIG. 6B, the upstream ends of the grooves 21 are isolated from the first circumferential groove 16 by a land, and the downstream ends are connected to the second circumferential groove 17. The upstream ends of the second negative pressure generation grooves 15 (grooves 15) of the second fluid-side negative pressure generation mechanism 14 (spiral mechanism 14) are isolated from the first circumferential groove 16 by a land.

In FIG. 6C, the upstream ends of the grooves 21 are isolated from the first circumferential groove 16 by a land, and the downstream ends are isolated from the second circumferential groove 17 by a land. The upstream ends of the second negative pressure generation grooves 15 (grooves 15) of the second fluid-side negative pressure generation mechanism 14 (spiral mechanism 14) are isolated from the first circumferential groove 16 by a land.

As a modification of FIG. 6C, the upstream ends of the second negative pressure generation grooves 15 (grooves 15) of the second fluid-side negative pressure generation mechanism 14 (spiral mechanism 14) may be connected to the first circumferential groove 16.

In FIG. 6D, the upstream ends of the grooves 21 are connected to the first circumferential groove 16, and the downstream ends are isolated from the second circumferential groove 17 by a land. The upstream ends of the second negative pressure generation grooves 15 (grooves 15) of the second fluid-side negative pressure generation mechanism 14 (spiral mechanism 14) are connected to the first circumferential groove 16.

In FIG. 6E, the upstream ends of the grooves 21 are connected to the first circumferential groove 16, and the downstream ends are isolated from the second circumferential groove 17 by a land. The upstream ends of the second negative pressure generation grooves 15 (grooves 15) of the second fluid-side negative pressure generation mechanism 14 (spiral mechanism 14) are isolated from the first circumferential groove 16 by a land.

In FIG. 6F, the first circumferential groove 16 and the second circumferential groove 17 are eliminated, and the upstream ends and the downstream ends of the grooves 21 are surrounded by a land R. The upstream ends of the second negative pressure generation grooves 15 (grooves 15) of the second fluid-side negative pressure generation mechanism 14 (spiral mechanism 14) are also surrounded by the land R.

Third Embodiment

With reference to FIGS. 7A to 7F, a sliding component according to a third embodiment of the present invention will be described.

The third embodiment is different from the second embodiment in that the dynamic pressure generation mechanism is formed by a spiral mechanism, but the other basic configuration thereof is the same as that of the second embodiment. The same reference numeral is assigned to the same member without duplicated explanation.

In FIGS. 7A to 7F, grooves 23 of a spiral mechanism 22 constituting the dynamic pressure generation mechanism are of a curved (spiral) shape enlarged from upstream to downstream toward the second-fluid side. Consequently, by sliding on the mating sliding face, dynamic pressure (positive pressure) is generated at the grooves 23, causing the first fluid to enter between the sliding faces and increase the fluid film, so that lubrication performance can be improved.

Figure 7:
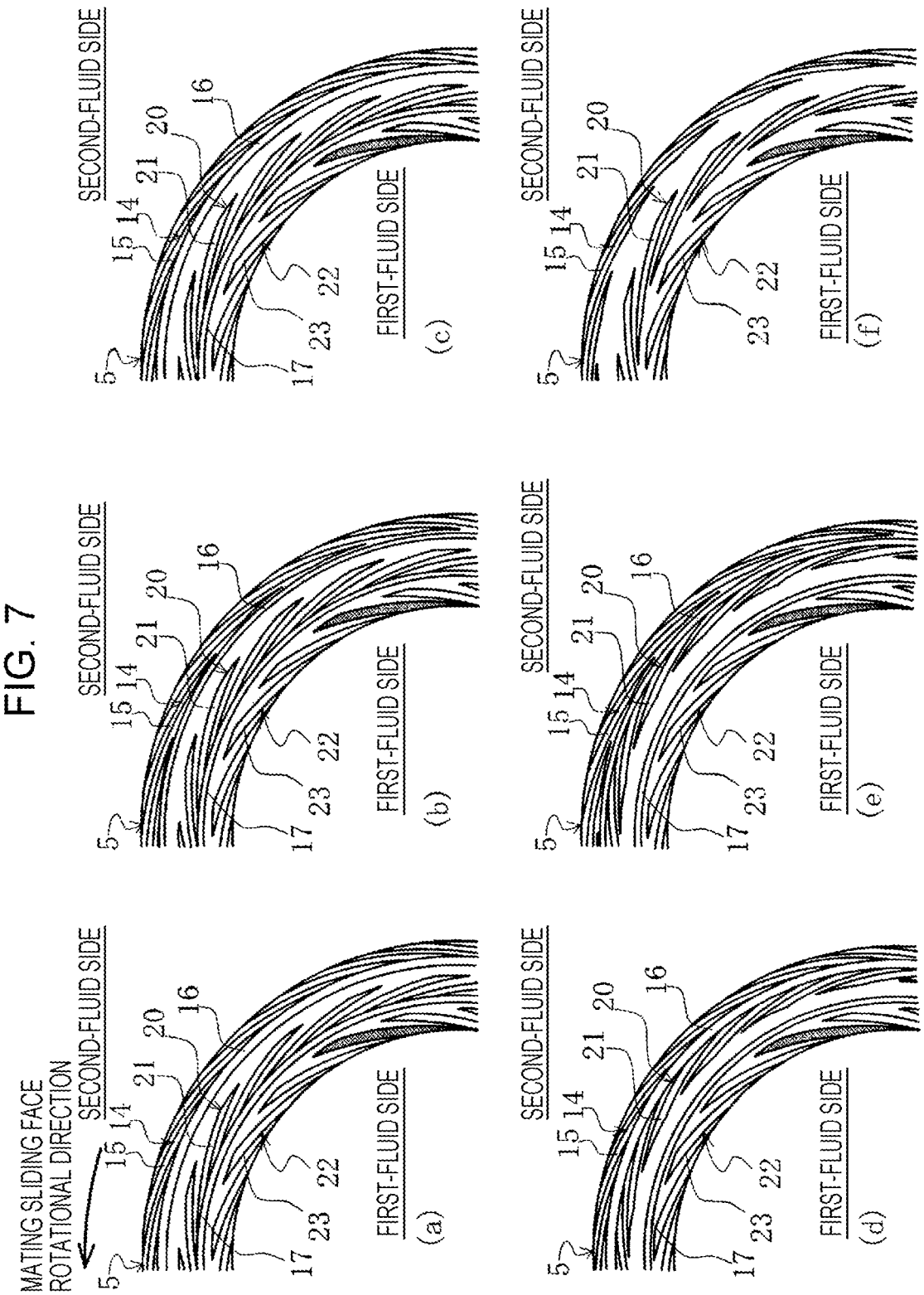
FIGS. 7A to 7F show a plan view of a sliding face of a sliding part according to a third embodiment of the present invention.

In FIG. 7A, upstream ends of the grooves 23 are connected to the first-fluid side, and downstream ends are isolated from the second circumferential groove 17 by a land. Some of the grooves 23 are formed as deep grooves with the same depth as that of the second circumferential groove 17.

The upstream ends of the grooves 21 are isolated from the first circumferential groove 16 by a land, and the downstream ends are connected to the second circumferential groove 17.

The upstream ends of the second negative pressure generation grooves 15 (grooves 15) of the second fluid-side negative pressure generation mechanism 14 (spiral mechanism 14) are connected to the first circumferential groove 16.

In FIG. 7B, the grooves 23 and the grooves 21 are the same as those in FIG. 7A, but the upstream ends of the grooves 15 are isolated from the first circumferential groove 16 by a land.

In FIG. 7C, the grooves 23 and the grooves 15 are the same as those in FIG. 7A, but the upstream ends of the grooves 21 are isolated from the first circumferential groove 16 by a land, and the downstream ends are isolated from the second circumferential groove 17 by a land.

Note that in FIG. 7C, the upstream ends of the grooves 15 may be isolated from the first circumferential groove 16 by a land.

In FIG. 7D, the grooves 23 and the grooves 15 are the same as those in FIG. 7A, but the upstream ends of the grooves 21 are connected to the first circumferential groove 16, and the downstream ends are isolated from the second circumferential groove 17 by a land.

In FIG. 7E, the grooves 23 and the grooves 15 are the same as those in FIG. 7B, but the upstream ends of the grooves 21 are connected to the first circumferential groove 16, and the downstream ends are isolated from the second circumferential groove 17 by a land.

In FIG. 7F, the first circumferential groove 16 and the second circumferential groove 17 are eliminated, the upstream ends and the downstream ends of the grooves 21 are surrounded by a land R, and the upstream ends of the grooves 15 are also surrounded by the land R.

Fourth Embodiment

Figure 8:
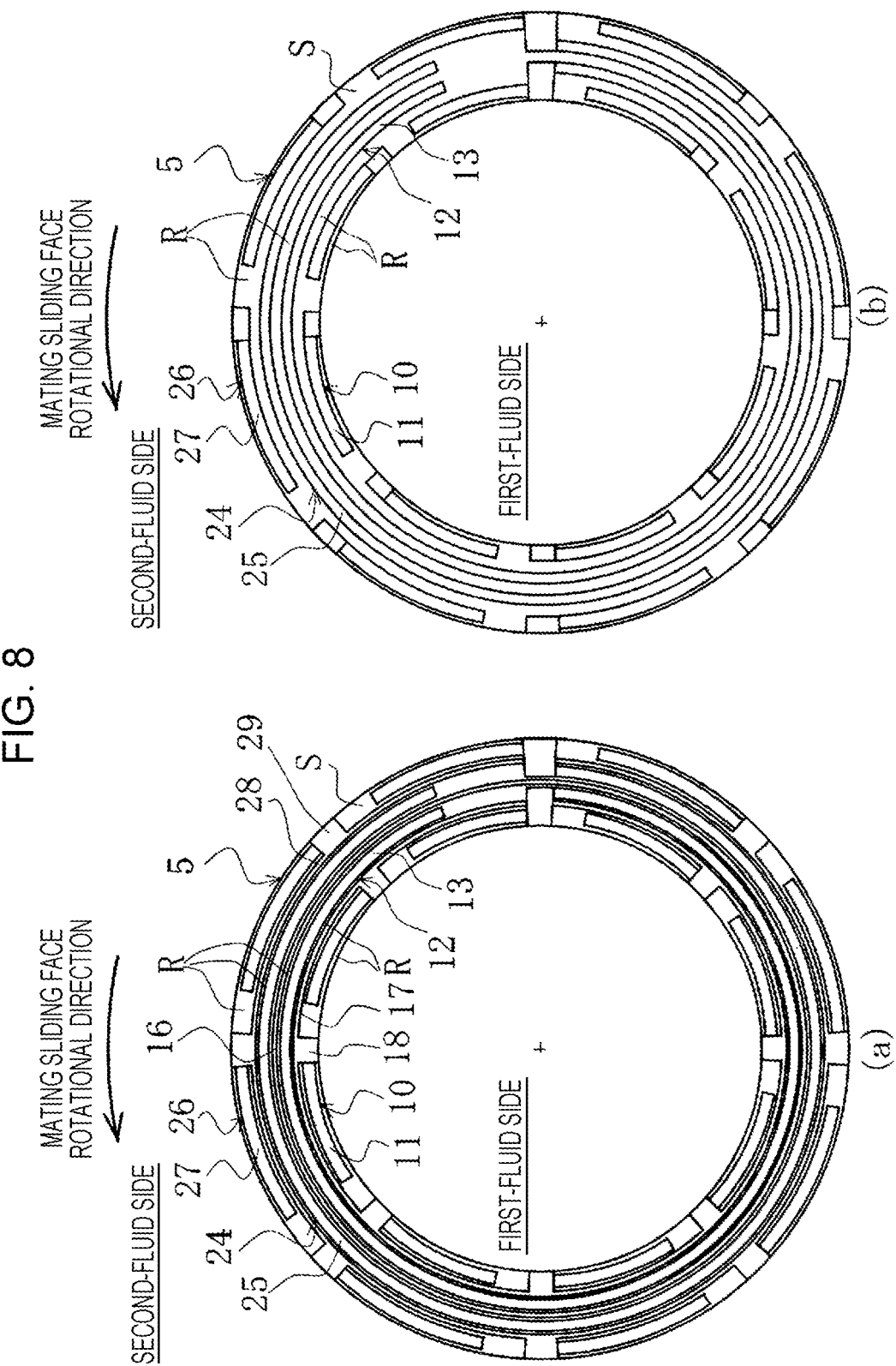
FIGS. 8A and 8B show a plan view of a sliding face of a sliding part according to a fourth embodiment of the present invention.

With reference to FIGS. 8A and 8B, a sliding component according to a fourth embodiment of the present invention will be described.

The fourth embodiment is different from the first embodiment in that the second fluid-side negative pressure generation mechanism is formed by a reversed Rayleigh step mechanism, and a dynamic pressure generation mechanism is provided on the second-fluid side of the second fluid-side negative pressure generation mechanism, but the other basic configuration thereof is the same as that of the first embodiment. The same reference numeral is assigned to the same member without duplicated explanation.

In FIG. 8A, the second fluid-side negative pressure generation mechanism is formed by a reversed Rayleigh step mechanism 24, and a dynamic pressure generation mechanism formed by a Rayleigh step mechanism 26 is provided on the second-fluid side of the reversed Rayleigh step mechanism 24.

An annular third circumferential groove 28 is provided between a groove 25 of the reversed Rayleigh step mechanism 24 and grooves 27 of the Rayleigh step mechanism 26. The annular third circumferential groove 28 is connected to the second-fluid side through radial deep grooves 29. Upstream ends of the grooves 27 of the Rayleigh step mechanism 26 are also connected to the second-fluid side through the radial deep grooves 29. The groove depth of the third circumferential groove 28 is equal to the groove depth of the first circumferential groove 16 and the second circumferential groove 17.

In the present example, the Rayleigh step mechanism 26 constituting the dynamic pressure generation mechanism is provided on the second-fluid side of the second fluid-side negative pressure generation mechanism, that is, in a position closest to the second-fluid side, and thus, in conjunction with the function of the Rayleigh step mechanism 10 constituting the dynamic pressure generation mechanism provided on the first-fluid side, a liquid film can be formed over the entire sliding face, and lubrication of the sliding faces can be further ensured.

Even when the first circumferential groove 16, the second circumferential groove 17, and the third circumferential groove 28 are not provided as shown in FIG. 8B, the object of the present invention can be achieved.

Fifth Embodiment

With reference to FIGS. 9A to 9F, a sliding component according to a fifth embodiment of the present invention will be described.

The fifth embodiment is different from the fourth embodiment in that the first fluid-side negative pressure generation mechanism, the second fluid-side negative pressure generation mechanism, the dynamic pressure generation mechanism on the first-fluid side, and the dynamic pressure generation mechanism on the second-fluid side are each formed by a spiral mechanism, but the other basic configuration thereof is the same as those of the above first to fourth embodiments. The same reference numeral is assigned to the same member without duplicated explanation.

Figure 9:
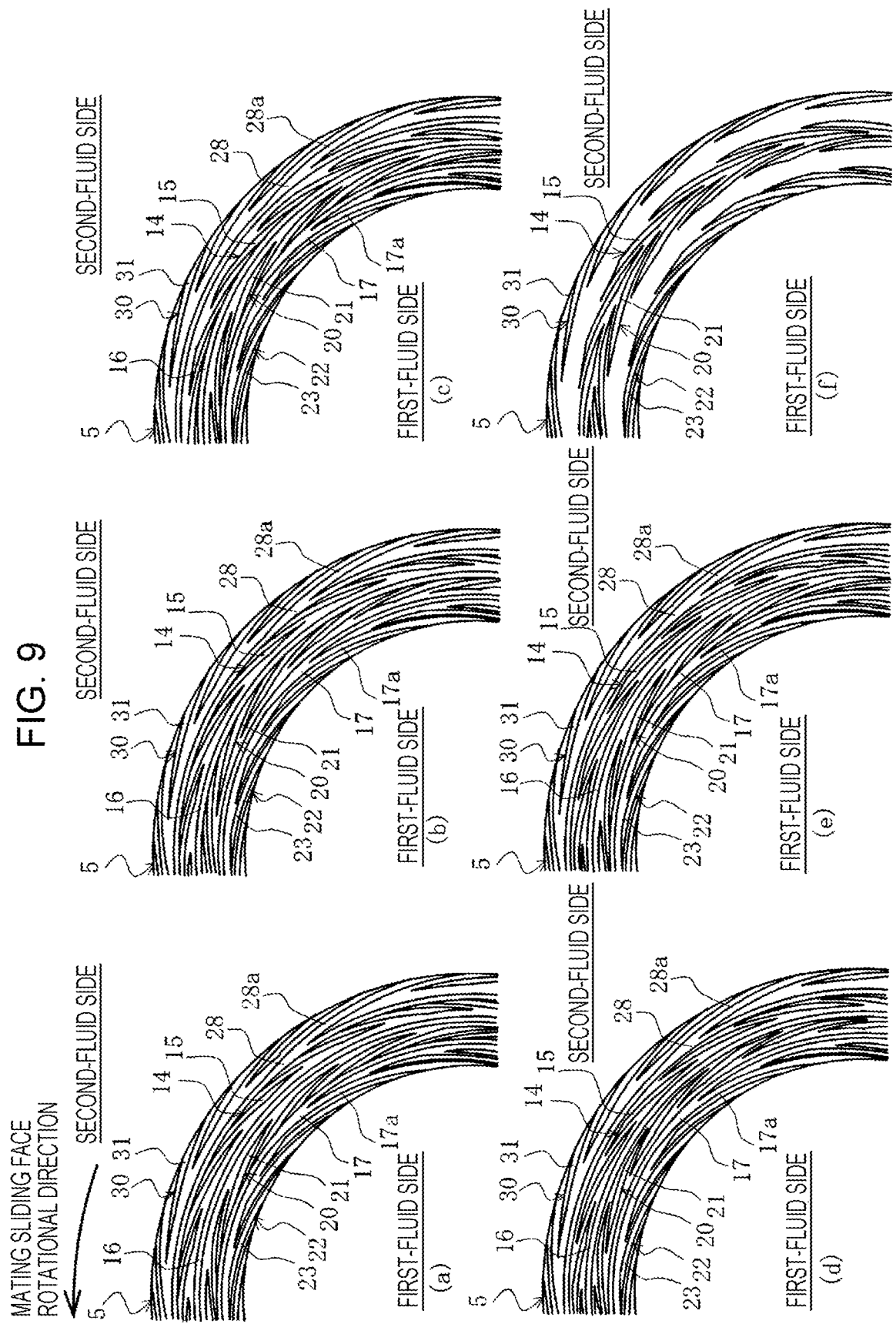
FIGS. 9A to 9F show a plan view of a sliding face of a sliding part according to a fifth embodiment of the present invention.

In FIG. 9A, the first fluid-side negative pressure generation mechanism is formed by the spiral mechanism 20, and the second fluid-side negative pressure generation mechanism is formed by the spiral mechanism 14.

The dynamic pressure generation mechanism formed by the spiral mechanism 22 is provided on the first-fluid side of the spiral mechanism 20 as the first fluid-side negative pressure generation mechanism. The dynamic pressure generation mechanism formed by a spiral mechanism 30 is provided on the second-fluid side of the spiral mechanism 14 as the second fluid-side negative pressure generation mechanism.

The first circumferential groove 16 is provided between the spiral mechanism 20 as the first fluid-side negative pressure generation mechanism and the spiral mechanism 14 as the second fluid-side negative pressure generation mechanism, the second circumferential groove 17 between the spiral mechanism 20 as the first fluid-side negative pressure generation mechanism and the spiral mechanism 22 as the dynamic pressure generation mechanism on the first-fluid side, and the third circumferential groove 28 between the spiral mechanism 14 as the second fluid-side negative pressure generation mechanism and the spiral mechanism 30 as the dynamic pressure generation mechanism on the second-fluid side.

In the case of FIG. 9A, the upstream ends of the grooves 21 of the spiral mechanism 20 are isolated from the first circumferential groove 16 by a land, and the downstream ends are connected to the second circumferential groove 17. The upstream ends of the grooves 15 of the spiral mechanism 14 are isolated from the first circumferential groove 16 by a land, and the downstream ends are connected to the third circumferential groove 28. Further, the second circumferential groove 17 is connected to the first-fluid side through an arc-shaped groove 17a, and the third circumferential groove 28 is connected to the second-fluid side through an arc-shaped groove 28a.

FIG. 9B is different from FIG. 9A in that the upstream ends of the grooves 21 of the spiral mechanism 20 are connected to the first circumferential groove 16, and the downstream ends are isolated from the second circumferential groove 17 by a land, but is the same as FIG. 9A in the other points.

FIG. 9C is different from FIG. 9A in that the upstream ends of the grooves 15 of the spiral mechanism 14 are connected to the first circumferential groove 16, and the downstream ends are isolated from the third circumferential groove 28 by a land, but is the same as FIG. 9A in the other points.

FIG. 9D is different from FIG. 9A in that none of the upstream ends and the downstream ends of the grooves 21 of the spiral mechanism 20 and the grooves 15 of the spiral mechanism 14 are connected to any deep groove but surrounded by lands R, but is the same as FIG. 9A in the other points.

FIG. 9E is different from FIG. 9A in that only the upstream ends and the downstream ends of the grooves 15 of the spiral mechanism 14 are not connected to any deep groove but surrounded by a land R, but is the same as FIG. 9A in the other points.

Even when the first circumferential groove 16, the second circumferential groove 17, and the third circumferential groove 28 are not provided as shown in FIG. 9F, the object of the present invention can be achieved.

Sixth Embodiment

With reference to FIGS. 10A to 10D, a sliding component according to a sixth embodiment of the present invention will be described.

The sixth embodiment relates to a sliding component suitable for both-direction rotation specifications, which allows a seal ring provided with a surface texture to be used without being changed even when the rotating-side seal ring 3 rotates in both directions.

In FIG. 10A, the sliding face S of the stationary-side seal ring 5 is provided with a dynamic pressure generation mechanism 32 including dynamic pressure generation grooves located on the first-fluid side, is provided with a first fluid-side negative pressure generation mechanism 35 including first negative pressure generation grooves 36 located on the center side of the dynamic pressure generation mechanism 32, and is provided with a second fluid-side negative pressure generation mechanism 37 including second negative pressure generation grooves 38 located on the second-fluid side of the first fluid-side negative pressure generation mechanism 35.

The annular first circumferential groove 16 deeper than the groove depth of the dynamic pressure generation grooves 33, the first negative pressure generation grooves 36, and the second negative pressure generation grooves 38 is provided between the first fluid-side negative pressure generation mechanism 35 and the second fluid-side negative pressure generation mechanism 37. The first circumferential groove 16 is isolated from the first-fluid side and the second-fluid side by lands R.

In the present example, the annular second circumferential groove 17 is further provided between the dynamic pressure generation mechanism 32 and the first fluid-side negative pressure generation mechanism 35. The second circumferential groove 17 is connected to the first-fluid side through the radial deep grooves 18, and is isolated from the second-fluid side by a land R.

The dynamic pressure generation mechanism 32 is formed by a Rayleigh step mechanism. The dynamic pressure generation grooves 33 are formed by grooves (hollows or recesses) of the Rayleigh step mechanism, and are formed symmetrically about the radial deep grooves 18.

The first fluid-side negative pressure generation mechanism 35 is formed by a reversed Rayleigh step mechanism. The first negative pressure generation grooves are formed by grooves of the reversed Rayleigh step mechanism, and are each formed symmetrically about a radial line O-O passing through the center of rotation.

The second fluid-side negative pressure generation mechanism 37 is formed by a reversed Rayleigh step mechanism. The second negative pressure generation grooves are formed by grooves of the reversed Rayleigh step mechanism, and are each formed symmetrically about the radial line O-O passing through the center of rotation.

An upstream end 36a and a downstream end 36b of each groove 36 of the reversed Rayleigh step mechanism 35 are located on the first-fluid side in close proximity to the second circumferential groove 17, and an intermediate portion 36c is located on the first-fluid side in close proximity to the first circumferential groove 16.

An upstream end 38a and a downstream end 38b of each groove 38 of the reversed Rayleigh step mechanism 37 are located on the second-fluid side in close proximity to the second-fluid side, and an intermediate portion 38c is located on the first-fluid side in close proximity to the first circumferential groove 16.

Even when the first circumferential groove 16 and the second circumferential groove 17 in FIG. 10A are not provided as shown in FIG. 10B, the object of the present invention can be achieved.

FIG. 10C is different from FIG. 10A in that a dynamic pressure generation mechanism 39 formed by a Rayleigh step mechanism is provided on the second-fluid side of the second fluid-side negative pressure generation mechanism 37, and the third circumferential groove 28 is provided between the second fluid-side negative pressure generation mechanism 37 and the dynamic pressure generation mechanism 39, but is the same as FIG. 10A in the other configuration.

Even when the first circumferential groove 16, the second circumferential groove 17, and the third circumferential groove 28 in FIG. 10C are not provided as shown in FIG. 10D, the object of the present invention can be achieved.

Seventh Embodiment

With reference to FIG. 11, a sliding component according to a seventh embodiment of the present invention will be described.

The seventh embodiment is different from the above embodiments in that a sliding face provided with the second fluid-side negative pressure generation mechanism is set in a lower position axially away from the mating sliding face relative to a sliding face provided with the first fluid-side negative pressure generation mechanism and the dynamic pressure generation mechanism, but is the same as the above embodiments in the other basic configuration, and will not be described redundantly.

In FIG. 11, the dynamic pressure generation groove 11 (groove 11) of the dynamic pressure generation mechanism 10 (Rayleigh step mechanism 10) and the first negative pressure generation groove 13 (groove 13) of the first fluid-side negative pressure generation mechanism 12 (reversed Rayleigh step mechanism 12) are formed on the sliding face S that slides on the mating sliding face.

On the other hand, the second negative pressure generation groove 15 (groove 15) of the second fluid-side negative pressure generation mechanism 14 (spiral mechanism 14) is set in a lower position axially away from the mating sliding face relative to the sliding face S.

Consequently, the design can have a degree of freedom, and can achieve almost the same discharge function as that when they are provided on the same plane.

The first circumferential groove 16 is provided on the sliding face S between the first negative pressure generation groove 13 (groove 13) and the second negative pressure generation groove 15 (groove 15). The second circumferential groove 17 is provided between the dynamic pressure generation groove 11 (groove 11) and the first negative pressure generation groove 13 (groove 13).

Although the embodiments of the present invention have been described above with reference to the drawings, a specific configuration thereof is not limited to these embodiments. Any changes and additions made to them without departing from the scope of the present invention are included in the present invention.

For example, although the embodiments have described the case where the sliding part is used as one of a pair of a rotating seal ring and a stationary seal ring in a mechanical seal device, the sliding part can be used as a bearing sliding part that slides on a rotating shaft while sealing lubricating oil on axially one side of a cylindrical sliding face.

Further, for example, although the embodiments have described the inner peripheral side of the sliding parts as the first fluid (e.g. water) side, and the outer peripheral side as the second fluid (e.g. oil) side, the present invention is not limited to this, and is applicable to a case where the positional relationship is reversed.

Further, the first fluid and the second fluid are not limited to liquid, and may be gas or misty gas.

Further, for example, the connection relationships between the upstream ends and the downstream ends of the grooves of the first negative pressure generation mechanism and the second negative pressure generation mechanism and the deep grooves are not limited to the examples described in the embodiments, and can be variously changed.

REFERENCE SIGNS LIST 1 rotating shaft
2 sleeve
3 rotating-side seal ring
4 housing
5 stationary-side seal ring
6 coiled wave spring
7 bellows
10 dynamic pressure generation mechanism
11 dynamic pressure generation groove
12 first fluid-side negative pressure generation mechanism
13 first negative pressure generation groove
14 second fluid-side negative pressure generation mechanism
15 second negative pressure generation groove
16 first circumferential groove
17 second circumferential groove
18 radial deep groove
20 spiral mechanism constituting first fluid-side negative pressure generation mechanism
21 groove
22 spiral constituting dynamic pressure generation mechanism
23 groove
24 reversed Rayleigh step mechanism constituting second fluid-side negative pressure generation mechanism
25 groove
26 Rayleigh step mechanism constituting dynamic pressure generation mechanism
27 groove
28 third circumferential groove
29 radial deep groove
30 spiral mechanism constituting dynamic pressure generation mechanism
31 groove
32 dynamic pressure generation mechanism
33 dynamic pressure generation groove
35 first fluid-side negative pressure generation mechanism
36 first negative pressure generation groove
37 second fluid-side negative pressure generation mechanism
38 second negative pressure generation groove
39 Rayleigh step mechanism constituting dynamic pressure generation mechanism
40 groove
S sliding face
R land

The invention claimed is:

1. A sliding structure comprising:
a pair of sliding parts sliding relative to each other, the pair of sliding parts each having a sliding face, on both sides of which a first fluid and a second fluid of different kinds are present,
wherein the sliding face of at least one of the sliding parts is provided with:
a first fluid-side negative pressure generation mechanism,
a second fluid-side negative pressure generation mechanism located on the second-fluid side of the first fluid-side negative pressure generation mechanism,
a dynamic pressure generation mechanism comprising dynamic pressure generation grooves on the first-fluid side of the first fluid-side negative pressure generation mechanism and the second fluid-side negative pressure generation mechanism,
a first land part by which the first fluid-side negative pressure generation mechanism and the second fluid-side negative pressure generation mechanism are isolated from each other,
a second land part by which the first fluid-side negative pressure generation mechanism and the dynamic pressure generation mechanism are isolated from each other,
a first annular circumferential groove provided in and running annularly through the first land part, and
a second annular circumferential groove provided in and running annularly through the second land part,
wherein:
the first fluid-side negative pressure generation mechanism is formed by a first spiral mechanism constituted by grooves, wherein an end of each groove on the first-fluid side communicates with the second annular circumferential groove, and an end of each groove on the second-fluid side is isolated from the first annular circumferential groove by the first land part,
the second fluid-side negative pressure generation mechanism is formed by a second spiral mechanism constituted by grooves, wherein an end of each groove on the first-fluid side communicates with the first annular circumferential groove, and an end of each groove on the second-fluid side communicates with the second-fluid side, and
the dynamic pressure generation mechanism is constituted by grooves each formed by a Rayleigh step, wherein each groove having the Rayleigh step communicates with the first-fluid side and is isolated from the second-fluid side by the second land part.

2. The sliding structure according to claim 1, wherein each of the first and second annular circumferential grooves has a groove depth set deeper than a groove depth of the grooves of the dynamic pressure generation mechanism, the grooves of the first fluid-side negative pressure generation mechanism, and the grooves of the second fluid-side negative pressure generation mechanism.

3. A sliding structure comprising:
a pair of sliding parts sliding relative to each other, the pair of sliding parts each having a sliding face, on both sides of which a first fluid and a second fluid of different kinds are present, wherein the sliding face of at least one of the sliding parts is provided with:
a first fluid-side negative pressure generation mechanism,
a second fluid-side negative pressure generation mechanism located on the second-fluid side of the first fluid-side negative pressure generation mechanism,
a dynamic pressure generation mechanism comprising dynamic pressure generation grooves on the first-fluid side of the first fluid-side negative pressure generation mechanism and the second fluid-side negative pressure generation mechanism,
a first land part by which the first fluid-side negative pressure generation mechanism and the second fluid-side negative pressure generation mechanism are isolated from each other,
a second land part by which the first fluid-side negative pressure generation mechanism and the dynamic pressure generation mechanism are isolated from each other,
a first annular circumferential groove provided in and running annularly through the first land part, and
a second annular circumferential groove provided in and running annularly through the second land part,
wherein:
the first fluid-side negative pressure generation mechanism is formed by a first spiral mechanism constituted by grooves, wherein an end of each groove on the first-fluid side communicates with the second annular circumferential groove, and an end of each groove on the second-fluid side is isolated from the first annular circumferential groove by the first land part,
the second fluid-side negative pressure generation mechanism is formed by a second spiral mechanism constituted by grooves, wherein an end of each groove on the first-fluid side is isolated from the first annular circumferential groove by the first land part, and an end of each groove on the second-fluid side communicates with the second-fluid side, and
the dynamic pressure generation mechanism is constituted by grooves each formed by a Rayleigh step, wherein each groove having the Rayleigh step communicates with the first-fluid side and is isolated from the second-fluid side by the second land part.

4. The sliding structure according to claim 3, wherein each of the first and second annular circumferential grooves has a groove depth set deeper than a groove depth of the grooves of the dynamic pressure generation mechanism, the grooves of the first fluid-side negative pressure generation mechanism, and the grooves of the second fluid-side negative pressure generation mechanism.

5. A sliding structure comprising:
a pair of sliding parts sliding relative to each other, the pair of sliding parts each having a sliding face, on both sides of which a first fluid and a second fluid of different kinds are present,
wherein the sliding face of at least one of the sliding parts is provided with:
a first fluid-side negative pressure generation mechanism,
a second fluid-side negative pressure generation mechanism located on the second-fluid side of the first fluid-side negative pressure generation mechanism,
a dynamic pressure generation mechanism comprising dynamic pressure generation grooves on the first-fluid side of the first fluid-side negative pressure generation mechanism and the second fluid-side negative pressure generation mechanism,
a first land part by which the first fluid-side negative pressure generation mechanism and the second fluid-side negative pressure generation mechanism are isolated from each other,
a second land part by which the first fluid-side negative pressure generation mechanism and the dynamic pressure generation mechanism are isolated from each other,
a first annular circumferential groove provided in and running annularly through the first land part, and
a second annular circumferential groove provided in and running annularly through the second land part,
wherein:
the first fluid-side negative pressure generation mechanism is formed by a first spiral mechanism constituted by grooves, wherein an end of each groove on the first-fluid side is isolated from the second annular circumferential groove by the second land part, and an end of each groove on the second-fluid side is isolated from the first annular circumferential groove by the first land part,
the second fluid-side negative pressure generation mechanism is formed by a second spiral mechanism constituted by grooves, wherein an end of each groove on the first-fluid side is isolated from the first annular circumferential groove by the first land part, and an end of each groove on the second-fluid side communicates with the second-fluid side, and
the dynamic pressure generation mechanism is constituted by grooves each formed by a Rayleigh step, wherein each groove having the Rayleigh step communicates with the first-fluid side and is isolated from the second-fluid side by the second land part.

6. The sliding structure according to claim 5, wherein each of the first and second annular circumferential grooves has a groove depth set deeper than a groove depth of the grooves of the dynamic pressure generation mechanism, the grooves of the first fluid-side negative pressure generation mechanism, and the grooves of the second fluid-side negative pressure generation mechanism.

* * * * *